United States Patent Office 2,915,536
Patented Dec. 1, 1959

2,915,536

MANUFACTURE OF 6,8-DIHYDROXY-n-OCTANOIC ACID-1

Arthur Lüttringhaus, Freiburg im Breisgau, and Karl Hägele, Hilzingen, near Singen (Hohentwiel), Germany, assignors to E. Merck, Aktiengesellschaft Darmstadt, Darmstadt, Germany, a corporation of Germany No Drawing. Application October 2, 1957
Serial No. 688,101

Claims priority, application Germany October 13, 1956

5 Claims. (Cl. 260—413)

This invention relates to 6,8-dihydroxy-n-octanoic acid-1; and in particular is directed to a novel method for the manufacture thereof.

6,8-dihydroxy-n-octanoic acid-1 is a valuable intermediate in the synthesis of alpha-lipoic acid which plays an important role as a coenzyme in metabolism, participating in the transference of acetyl groups to coenzyme A. It is used in the therapy of liver afflictions.

Braude and his co-workers have obtained the 6,8- dihydroxy-n-octanoic acid-1-methylester from 1-bromo-pentene-(4) which is first condensed with malonic acid. The condensation product while undergoing saponification is partially decarboxylated. The thus prepared $\Delta^6$ heptenoic acid-1, $CH_2=CH.(CH_2)_4.COOH$, is then converted by means of the Prins-Reaction through condensation with formaldehyde, in the presence of concentrated sulfuric acid, acetic acid and acetic anhydride to 4-(4'-carboxyl-butyl-1')-dioxane-(1,3). On esterification with diazomethane and finally reacetalization with methanol, there is obtained the 6,8-dihydroxy-n-octanoic acid-1-methylester.

That synthesis, aside from the known isomerization of unsaturated acids by sulfuric acid, through drifting of the double bond, to lactones, has the disadvantage that the condensation product can not be directly reacetalized with methanol, because there is produced a mixture of 4-(4'-carboxyl-butyl-1')-dioxane-(1,3) and 6,8-diacetoxy-n-octanoic acid-1. The acid hydrolysis consequently does not give the desired 6,8-dihydroxy-n-octanoic acid-1, but primarily the epsilon-lactone (6,8-dihydroxy-n-octanoic acid-1-lactone-6). Braude and his co-workers were, therefore, justified in first esterifying the resultant end product from the Prins-Reaction with diazo-methane which was then reacetalized to produce the 6,8-dihydroxy-n-octanoic acid-1-methylester.

It has now been found, that a reaction step can be eliminated and the synthesis substantially improved by subjecting 1-bromo-pentene-4 directly to the Prins-Reaction, i.e., prior to the malonic ester condensation. There is thus obtained a uniform reaction product, the 4-(3'-bromo-propyl-1')-dioxane-(1,3). From that product, by reaction with malonic acid ester, subsequent saponification and decarboxylation, there is obtained in good yield the 4-(4'-carboxyl-butyl-1')-dioxane-(1,3). That acid can be directly reacetalized and there is obtained a yield of the 6,8-dihydroxy-n-octanoic acid-1 in excess of 90%.

This synthesis proceeds according to the following diagrammatic formulation:

$CH_2=CH-(CH_2)_3Br \xrightarrow[H_2SO_4]{\text{Prins-Reaction}}$

2 $\overset{+}{C}H_2O$

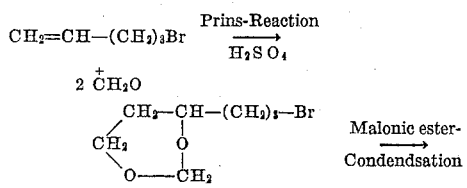

Malonic ester-
Condendsation

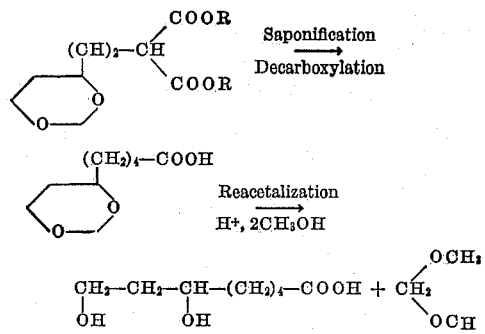

Saponification
Decarboxylation $$(CH_2)_4-COOH$$

Reacetalization
$\xrightarrow{H^+, 2CH_3OH}$ $$\underset{OH}{CH_2}-\underset{OH}{CH_2}-CH-(CH_2)_4-COOH + CH_2\begin{matrix}OCH_3\\OCH_3\end{matrix}$$

The addition of 2 mols of formaldehyde to one mol of 1-bromo-pentene-4 by the Prins-Reaction (Chem. Weekblad, vol. 14, p. 932 (1917); Proc. Akad. Wetensch., Amsterdam, vol. 22, p. 51 (1919), Chemisches Zentralblatt, 1919, III, S. 1001)) takes place under the influence of concentrated sulfuric acid with good yields. The malonic ester condensation is carried out by the dropwise addition of the sodium compound of diethyl malonate. The subsequent saponification is carried out with an aqueous-alcoholic solution of caustic potash, while the partial decarboxylation to 4-(4'-carboxy-butyl-1')-dioxane-(1,3) is obtained in good yield by heating with a tertiary base, preferable picoline or pyridine. The reacetalization with methanol may be quickly and quantitatively achieved, by continuously distilling off the formed formaldehyde-dimethylacetal from the reaction mixture.

The following exemplify the invention, in which the weights are in grams (g.):

(a) *1-bromo-pentene-4*

86 g. of pentene-4-ol-1 (prepared, for example, by the method of Organic Synthesis, 25, 84, from tetrahydrofurfuralcohol) are mixed with 14 g. of pyridine. The mixture is added dropwise, with shaking, to 94 g. of phosphorus tribromide (contained in a Claisen flask cooled with an ice-salt mixture). On the following day, the mass is distilled under greatly reduced pressure; the distillate washed with water; sodium bicarbonate and water; and dried over calcium chloride. There are obtained 100 to 110 g. of the unsaturated bromide of B.P. $_{116\ mm.}$ 68–70° C.

(b) *4-(3'-bromo-propyl-1')-1,3-dioxane*

To a mixture of 60 g. of the above bromide (product of (a)) and 28 g. of paraformaldehyde there are added dropwise, at 50°–60° C., with stirring, 30 g. of 75% sulfuric acid. It was observed that the temperature rises after the addition of ⅔ of the sulfuric acid. The balance is added after cooling to about the initial temperature. The mass is stirred for 15 minutes at 55°–60° C. with soda ($Na_2CO_3$) solution; allowed to cool for 90 minutes; extracted with ether; and washed with sodium bicarbonate and water. The ethereal residue is then distilled. The distillate, B.P. $_{0.2\ mm.}$, 69°–72° C., is obtained in a yield of more than 60%.

(c) *4-(4',4'-di-carboxy-1'-butyl)-dioxane-(1,3)*

To a solution of 5.6 g. of sodium in 80 ml. of absolute ethanol there were added 40 g. of diethylmalonate, and to the mixture at 50° C., while stirring, there were added 52 g. of the foregoing bromide (product of (b)). The mass was stirred for a further 4 hours at 50°–60° C. On the following day, the mass was poured into ice water, and the ester shaken out with ether. The ester was obtained in a yield of 70–74%. It boiled at 136°–140° C. under a pressure of 0.2 mm.

Upon cooking for 5 hours with an excess of aqueousethanolic caustic potash, the ester was saponified. Most of the solvent was drawn off, and the residue was acidified with half-concentrated (40%) sulfuric acid until it was just acidic on the mineral acid side. The saponification product was extracted with ether in a Kutscher-Steudel apparatus. The yield was 89%.

(d) *4-(4'-carboxybutyl)-dioxane-(1,3)*

35 g. of the above described malonic acid (product of (c)) were heated with 55 g. of alpha-picoline (or pyridine) for 2 hours at 135°–140° C. The base was removed by distillation. The residual acid distilled at 142°–144° C. (0.2 mm.); solidified immediately; and had a melting point (from petroleum ether) of 70° C. The yield was virtually theoretical.

(e) *6,8-dihydroxy-n-octanoic acid-1*

To carry out the reacetalization, 22 g. of the foregoing acid (product of (d)) were heated with 80 g. of methanol, 10 g. of water and 14 g. of concentrated sulfuric acid in a Vigreux-column for 10 hours, whereby the formed formaldehyde-dimethyl acetal (B.P. 42° C.) slowly distilled out. Then, while being cooled, an excess of caustic soda solution (15%) was added thereto; and cooled for 2 hours. The solvent was removed; the residue was acidified with 40% sulfuric acid until just acidic on the mineral acid side; and the dihydroxy acid liberated. It was obtained in crystalline form by extraction with ether. After washing with benzene, ethyl acetate and cyclohexane, its melting point was 68°–69° C. The yield was 90% of the theoretical.

It will be understood that the foregoing description of the invention and the examples set forth are merely illustrative of the principles thereof. Accordingly, the appended claims are to be construed as defining the invention within the full spirit and scope thereof.

What is claimed is:

1. A process of manufacturing 6,8-dihydroxy-n-octanoic acid-1 which comprises heating (I) 1bromo-pentene-4 with formaldehyde in the presence of acid to produce (II) 4-(3'-bromo-propyl-1') - dioxane - (1,3); heating (II) with a malonic acid ester to produce (III) a 4-substituted 1,3-dioxane, saponifying (III) with an alkali metal hydroxide with simultaneous decarboxylation of the saponification product, and heating said partially decarboxylated saponification product with methanol to effectuate rupture of the dioxane ring with formation of the 6,8-dihydroxy-n-octanoic acid-1.

2. A process of manufacturing 6,8-dihydroxy-n-octanoic acid-1 which comprises heating (I) 1-bromo-pentene-4 with formaldehyde in accordance with the conditions of the Prins-Reaction to produce (II) 4-(3'-bromo-propyl-1')-dioxane-(1,3); heating (II) with a malonic acid ester to produce (III) a 4-substituted 1,3-dioxane, saponifying (III) and heating the saponification product, thereby partially to decarboxylate the same, and heating said partially decarboxylated saponification product with methanol to effectuate rupture of the dioxane ring with formation of the 6,8-dihydroxy-n-octanoic acid-1.

3. A process of manufacturing 6,8-dihydroxy-n-octanoic acid-1 which comprises heating (I) 1-bromo-pentene-4 with formaldehyde to produce (II) 4-(3'-bromo-propyl-1')-dioxane-(1,3); heating (II) with diethyl malonate to produce (III) 4-(4',4'-diethoxycarbo-1'-butyl)-dioxane-(1,3), saponifying (III) and partially decarboxylating the saponification product to produce IV-(4'-carboxy-1'-butyl)-dioxane-(1,3), and heating (IV) with methanol to effectuate rupture of the dioxane ring with formation of the 6,8-dihydroxy-n-octanoic acid-1.

4. A process of manufacturing 6,8-dihydroxy-n-octanoic acid-1 which comprises heating (I) 1-bromo-pentene-4 with formaldehyde to produce (II) 4-(3'-bromo-propyl-1')-dioxane-(1,3); heating (II) with the sodium compound of diethyl malonate to produce (III) 4-(4',4'-diethoxycarbo-1'-butyl)-dioxane-(1,3), saponifying (III) and partially decarboxylating the saponification product to produce (IV) (4'-carboxy-1'-butyl)-dioxane-(1,3), and heating (IV) with methanol to effectuate rupture of the dioxane ring with formation of the 6,8-dihydroxy-n-octanoic acid-1.

5. A process of manufacturing 6,8-dihydroxy-n-octanoic acid-1 which comprises the steps of heating 4-(3'-bromo-propyl-1')-dioxane-(1,3) with a malonic ester to produce a 4-substituted 1,3-dioxane, saponifying said 4-substituted 1,3-dioxane and partially decarboxylating the saponification product, and heating said partially decarboxylated saponification product with methanol to effectuate rupture of the dioxane ring with formation of the 6,8-dihydroxy-n-octanoic acid-1.

References Cited in the file of this patent

UNITED STATES PATENTS 2,806,048     Metuchen     Sept. 10, 1957

OTHER REFERENCES

"Chemistry and Industry" (British), Apr. 30, 1955, p. 508, article by Brande et al., entitled "A New Synthesis of 6:8-Thioctic Acid."